US012801728B2

(12) United States Patent
Ezrielev et al.

(10) Patent No.: US 12,801,728 B2
(45) Date of Patent: Nov. 17, 2026

(54) MANAGING IMPACT OF POISONED INFERENCES ON INFERENCE CONSUMERS BASED ON USE OF THE INFERENCES BY THE INFERENCE CONSUMERS

(71) Applicant: Dell Products L.P., Round Rock, TX (US)

(72) Inventors: Ofir Ezrielev, Beer Sheva (IL); Tomer Kushnir, Omer (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/459,133

(22) Filed: Aug. 31, 2023

(65) Prior Publication Data

US 2025/0077650 A1 Mar. 6, 2025

(51) Int. Cl.
*G06F 21/55* (2013.01)

(52) U.S. Cl.
CPC .................................... *G06F 21/55* (2013.01)

(58) Field of Classification Search
CPC .............................................. G06F 21/55–556
See application file for complete search history.

(56) References Cited

U.S. PATENT DOCUMENTS

| | | | |
|---|---|---|---|
| 6,922,816 | B1 | 7/2005 | Amin et al. |
| 10,936,173 | B2 | 3/2021 | Ubillos et al. |
| D917,546 | S | 4/2021 | Mayler et al. |
| 11,030,709 | B2 | 6/2021 | McLinden et al. |
| 11,449,942 | B2 | 9/2022 | Basu et al. |

(Continued)

FOREIGN PATENT DOCUMENTS

| | | | |
|---|---|---|---|
| EP | 4481632 | A1 | 12/2024 |
| KR | 20250011365 | A | 1/2025 |

(Continued)

OTHER PUBLICATIONS

Wang, Zhibo, et al. "Threats to training: A survey of poisoning attacks and defenses on machine learning systems." ACM Computing Surveys 55.7 (2022): 1-36. (Year: 2022).*

(Continued)

*Primary Examiner* — Madhuri R Herzog
(74) *Attorney, Agent, or Firm* — WOMBLE BOND DICKINSON (US) LLP

(57) ABSTRACT

Methods and systems for managing impact of inferences provided to inference consumers are disclosed. An artificial intelligence (AI) model may be poisoned by poisoned training data and may provide poisoned inferences to an inference consumer. To determine whether to remediate the poisoned inference, first use of the poisoned inference may be compared to second use of a second inference generated by a second AI model that is not believed to be poisoned. The first use and the second use may be the same type of use and a deviation between the first use and the second use may indicate an extent to which the poisoned inference impacted the inference consumer. A quantification of the deviation may be obtained and compared to a quantification threshold. If the quantification meets the quantification threshold, an action set may be performed to remediate the impact of the poisoned inference.

20 Claims, 8 Drawing Sheets

(56) References Cited

U.S. PATENT DOCUMENTS

| | | | | |
|---|---|---|---|---|
| 11,460,997 | B2 | 10/2022 | Homma et al. | |
| 11,783,025 | B2 | 10/2023 | Molloy | |
| 2018/0293516 | A1 | 10/2018 | Lavid Ben Lulu | |
| 2020/0019821 | A1 | 1/2020 | Baracaldo-Angel | |
| 2020/0334122 | A1 | 10/2020 | Shepard | |
| 2021/0064388 | A1* | 3/2021 | Gardner | G06F 11/3055 |
| 2021/0089941 | A1 | 3/2021 | Chen | |
| 2021/0141708 | A1 | 5/2021 | Mathur | |
| 2021/0209512 | A1* | 7/2021 | Gaddam | H04L 63/1408 |
| 2021/0224684 | A1 | 7/2021 | Sarkar | |
| 2021/0374247 | A1 | 12/2021 | Sultana | |
| 2022/0027792 | A1 | 1/2022 | Cummings | |
| 2022/0050928 | A1 | 2/2022 | Shukla | |
| 2022/0078637 | A1 | 3/2022 | Tullberg | |
| 2022/0300857 | A1 | 9/2022 | Lavid Ben Lulu | |
| 2023/0030136 | A1 | 2/2023 | Lancioni | |
| 2023/0032822 | A1 | 2/2023 | Wang | |
| 2023/0198855 | A1 | 6/2023 | Ganesan | |
| 2023/0205158 | A1 | 6/2023 | Ramanasankaran | |
| 2023/0229789 | A1 | 7/2023 | Wu | |
| 2023/0274003 | A1 | 8/2023 | Liu | |
| 2023/0368074 | A1 | 11/2023 | Mallya | |
| 2024/0029078 | A1 | 1/2024 | Aurongzeb | |
| 2024/0134972 | A1 | 4/2024 | Boué | |
| 2024/0185090 | A1* | 6/2024 | Rafferty | G06N 20/00 |
| 2024/0195826 | A1 | 6/2024 | Mathews et al. | |
| 2024/0250975 | A1 | 7/2024 | Pourahmadi | |
| 2024/0273184 | A1 | 8/2024 | Yarabolu | |
| 2024/0273411 | A1* | 8/2024 | Mueck | H04L 9/3263 |
| 2024/0394419 | A1 | 11/2024 | Patzlaff | |
| 2025/0013913 | A1 | 1/2025 | Boué | |
| 2025/0078449 | A1* | 3/2025 | Omi | G06N 20/00 |
| 2025/0181358 | A1 | 6/2025 | Bilal | |
| 2025/0342389 | A1 | 11/2025 | Rosen | |
| 2026/0030061 | A1 | 1/2026 | Chen | |

FOREIGN PATENT DOCUMENTS

| | | | | |
|---|---|---|---|---|
| WO | WO-2020123985 | A1 * | 6/2020 | G06F 16/9038 |
| WO | 2021167733 | A1 | 8/2021 | |
| WO | 2022115623 | A1 | 6/2022 | |
| WO | 2022224246 | A1 | 10/2022 | |

OTHER PUBLICATIONS

Huang, Hai, et al. "Data poisoning attacks to deep learning based recommender systems." arXiv preprint arXiv:2101.02644 (2021). (Year: 2021).*

Anastasovski, Goce, "Classification of Malicious Web Traffic" (2013). Graduate Theses, Dissertations, and Problem Reports. 153. (118 Pages).

Joshi, Naveen, "Is The Data Used for Training Your Machine Learning Model Safe?" Technology for You, Jul. 28, 2022, Web Page <https://www.technologyforyou.org/is-the-data-used-for-training-your-machine-learning-model-safe/> accessed on Sep. 1, 2022 (3 Pages).

Di, Jimmy Z., et al. "Hidden poison: Machine unlearning enables camouflaged poisoning attacks." NeurIPS ML Safety Workshop. 2022. (28 Pages).

Wang, Siruo, et al., "Methods for correcting inference based on outcomes predicted by machine learning." Proceedings of the National Academy of Sciences 117.48 (2020): 30266-30275. (10 Pages).

Rauschmayr, Nathalie, et al., "Detecting and analyzing incorrect model predictions with Amazon SageMaker Model Monitor and Debugger," Amazon Web Services, Jul. 9, 2020, Web Page <https://aws.amazon.com/blogs/machine-learning/detecting-and-analyzing-incorrect-model-predictions-with-amazon-sagemaker-model-monitor-and-debugger/> accessed on Sep. 1, 2022 (13 Pages).

Jackson Higgins, Kelly, "Honeypot Stings Attackers With Counter-attacks," DarkReading, Mar. 26, 2013, Web Page <https://www.darkreading.com/vulnerabilities-threats/honeypot-stings-attackers-with-counterattacks> accessed on Sep. 1, 2022 (4 Pages).

Susmelj, Igor, "The Data You Don't Need: Removing Redundant Samples," Towards Data Science, Mar. 19, 2020, Web Page <https://towardsdatascience.com/the-data-you-don-t-need-removing-redundant-samples-6bfd07c1516c> accessed on Sep. 1, 2022 (10 Pages).

Aghakhani, Hojjat, et al. "Bullseye polytope: A scalable clean-label poisoning attack with improved transferability." 2021 IEEE European symposium on security and privacy (EuroS&P). IEEE, 2021. (20 Pages).

Naveen Joshi, "Is The Data Used for Training Your Machine Learning Model Safe", Technology for You. Jul. 28, 2022, Retrieved from <https://www.technologyforyou.org/is-the-data-used-for-training-your-machine-learning-model-safe/> dated Sep. 1, 2022 (3 pages).

Guo et al., "Universal Detection of Backdoor Attacks via Density-Based Clustering and Centroids Analysis", arXiv:2301.04554v1 [cs.CV], Jan. 11, 2023; Total pp. 13 (Year: 2024).

Cretu et al., "Casting out Demons: Sanitizing Training Data for Anomaly Sensors", 2008 IEEE Symposium on Security and Privacy, Total pp. 15 (Year: 2008).

Ding et al., "Defending SVMs Against Poisoning Attacks: The Hardness and DBSCAN Approach", Proceedings of the Thirty-Seventh Conference on Uncertainty in Artificial Intelligence (UAI 2021), PMLR 161 :268-278; Total pp. 11 (Year: 2021).

Campello et al., "Density-Based Clustering Based on Hierarchical Density Estimates", Springer-Verlag Berlin Heidelberg 2013; Total pp. 13 (Year: 2013).

* cited by examiner

MANAGING IMPACT OF POISONED INFERENCES ON INFERENCE CONSUMERS BASED ON USE OF THE INFERENCES BY THE INFERENCE CONSUMERS

FIELD

Embodiments disclosed herein relate generally to artificial intelligence (AI) models. More particularly, embodiments disclosed herein relate to systems and methods to manage impact of inferences generated by AI models on consumers of the inferences.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
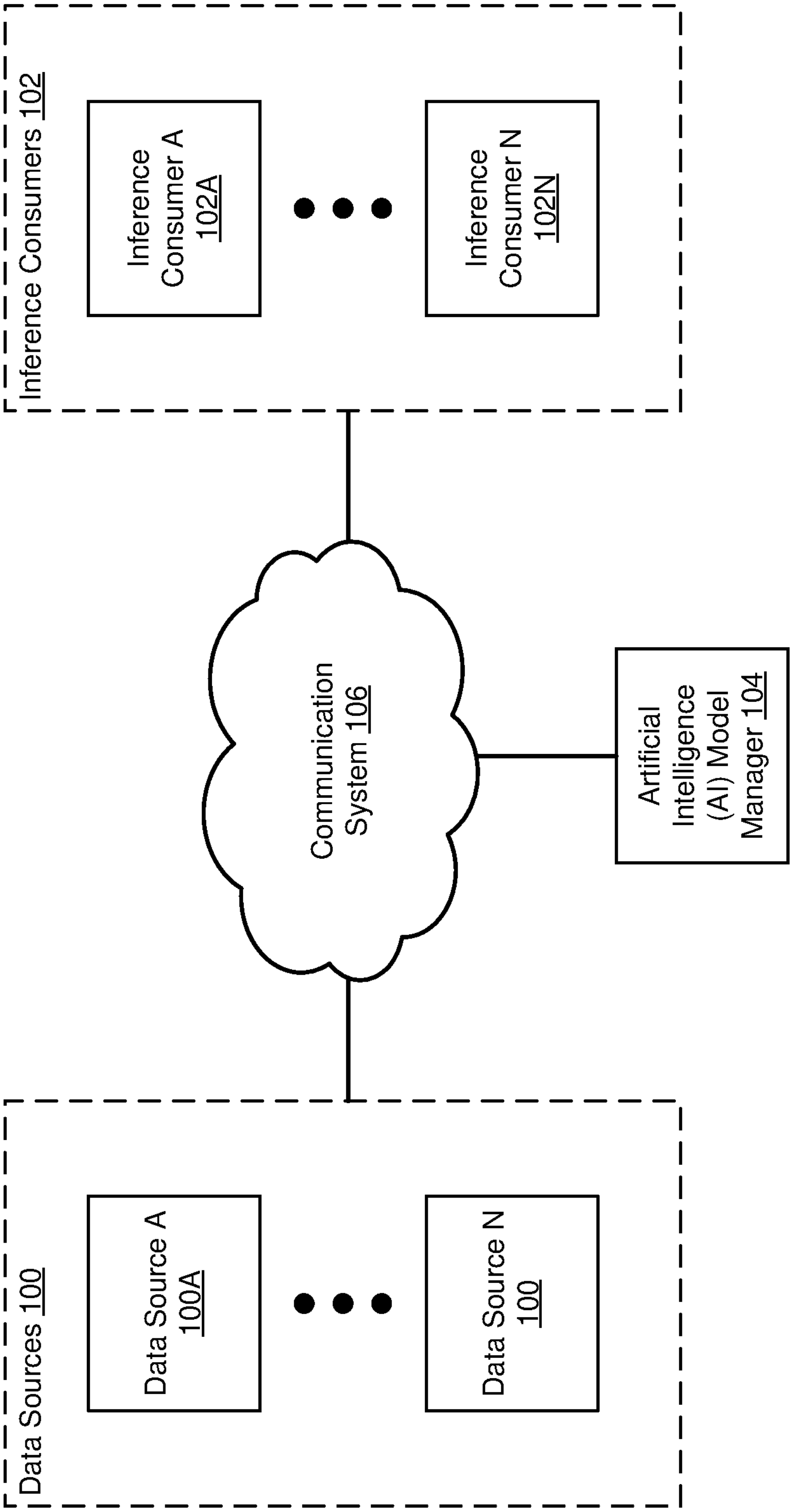
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing impact of inferences generated by AI models on inference consumers. Trained AI models may provide computer-implemented services (e.g., inference generation) for downstream consumers (e.g., inference consumers). To manage trained AI models, a data processing system may, over time, update AI models through training using training data. However, if poisoned training data is introduced to an AI model, the AI model may become untrustworthy (e.g., the AI model may be tainted by the poisoned training data). Inferences generated using the tainted (e.g., poisoned) AI model may also be untrustworthy or inaccurate.

Once it has been discovered that an AI model has been tainted with poisoned training data, the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation (and/or other purposes). In other words, computing resources spent re-training AI models may interrupt inference consumption and/or other types of computer-implemented services that may otherwise be provided using the computing resources dedicated to re-training.

To reduce computing resources spent re-training AI models, an AI model snapshot may be obtained periodically throughout the AI model training process. The snapshot may store information regarding the structure of the AI model, which may be used to restore a partially trained untainted AI model. The restored AI model may require additional training using only a subset of the original training dataset, thereby requiring fewer computational resources than re-training an AI model from scratch using the entire training dataset. Thus, reverting to a last known good AI model may require less resource expenditure than re-training an AI model from scratch.

Although the poisoned (e.g., tainted) AI model may be re-trained, poisoned inferences generated by the poisoned AI model may have already been provided to the inference consumer. Poisoned inferences may affect the operation of the inference consumer and/or may impact decisions regarding computer-implemented services provided by (and/or provided to) the inference consumer immediately and over time (via use of any decisions made based on the poisoned inferences to make future decisions). However, remediation of poisoned inferences (e.g., generating replacement inferences and transmitting the replacement inferences to the inference consumer) may consume an undesirable quantity of computing resources, may consume an undesirable amount of energy, and/or may consume excess network bandwidth due to the additional data transmissions involved.

To reduce the computing resources, energy consumption, and network bandwidth required to remediate a poisoned inference provided to an inference consumer (e.g., by providing a replacement inference, by transmitting a notification of a poisoned inference), the system may determine whether to remediate the poisoned inference based on an impact of the poisoned inference on the inference consumer. If a quantification of the impact of the poisoned inference meets a quantification threshold, the poisoned inference may be remediated. If the impact of the poisoned inference does not meet the threshold, the poisoned inference may not be remediated.

To determine the impact of the poisoned inference on the inference consumer, a second inference may be obtained from a second AI model, the second AI model being believed to not be poisoned. The second AI model may provide inferences of a same type (e.g., a product recommendation) as a type of the poisoned inference. A first use of the poisoned inference by a first inference consumer (e.g., an extent to which customers complete purchases of the recommended product) may be compared to a second use of the second inference by a second inference consumer to obtain a quantification of the impact of the poisoned inference on the first inference consumer.

By doing so, embodiments disclosed herein may provide a system for managing AI models in which the impact of poisoned inferences generated using a poisoned AI model may be computationally evaluated and potentially efficiently mitigated. By evaluating the impact of the poisoned inference on the first inference consumer, the computational resources, energy consumption, and network bandwidth typically associated with remediating poisoned inferences may be reduced, leaving more resources for inference generation.

In an embodiment, a method of managing inferences generated by artificial intelligence (AI) models is provided. The method may include: making an identification that a poisoned inference of the inferences has been provided to a first inference consumer, the poisoned inference being generated by a poisoned AI model of the AI models; identifying a second AI model of the AI models that provides inferences of a same type as a type of the poisoned inference; obtaining a quantification of an impact of the poisoned inference based on first use of the poisoned inference by the first inference consumer and second use of at least one inference generated by the second AI model by a second inference consumer; making a determination regarding whether to remediate the poisoned inference based on the quantification; and in an instance of the determination in which the poisoned inference is to be remediated: performing an action set to mitigate impact of the poisoned inference on the first inference consumer.

The first use and the second use may be a same type of use.

The second AI model may be believed to be not poisoned when the second inference is generated by the second AI model.

Obtaining the quantification may include: obtaining, based on the first use of the poisoned inference, a first sub-quantification indicating an impact on the first inference consumer.

Obtaining the quantification may also include: obtaining, based on the second use of the at least one inference, a second sub-quantification indicating an impact on the second inference consumer.

Obtaining the quantification may also include: obtaining a difference between the first sub-quantification and the second sub-quantification to obtain the quantification.

Making the determination may include: comparing the quantification to a quantification threshold.

The type may be based on labels from training data used to train the poisoned AI model.

The type may be a recommendation for a consumer of products offered by the first inference consumer and the second inference consumer.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, deep neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences.

To obtain AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104). However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI models may be obtained. The new versions of the AI models may be obtained, for example, due to requests from inference consumers 102, acquisition of additional training data that may improve the accuracy of inferences provided by the AI models, and/or for other reasons.

To obtain the new AI models, existing AI models may be used as a basis for new AI models thereby leveraging the existing resource expenditures used to obtain the existing AI models. For example, updated instances of the AI models may be obtained through training as more training data is obtained (e.g., incremental learning).

Training of AI models may be computationally costly because training may require significant resource expenditures. However, the introduction of malicious or poisoned training data can in turn, poison the new AI model instance, any inferences obtained from the poisoned AI model instance, and further poison other AI model instances derived from the new AI model instance.

In addition, provision of poisoned inferences to inference consumers 102 may impact operation of inference consumers 102 and/or use of inferences by inference consumers 102. For example, an inference may include a product recommendation for a customer. Use of the inference may include providing the inference to the customer (e.g., a consumer of products offered by inference consumers 102) and determining whether the customer completed a purchase of the recommended product. Use of the inference may also be dependent on other information, such as whether the customer returned the product after the purchase.

If the inference is a poisoned inference, the recommended product may not match the needs of the customer and, therefore, the customer may be more likely to return the product after purchase (or not purchase the product). Consequently, poisoned inferences may impact inference consumers 102 in a manner that causes undesirable and/or less useful computer-implemented services to be provided by inference consumers 102.

In general, embodiments disclosed herein may provide methods, systems, and/or devices for managing impact of inferences generated by AI models on inference consumers. The inferences and/or the AI models may be managed in a manner that allows for the impact of poisoned inferences to be evaluated and (potentially) remediated in a computationally efficient manner. By doing so, the system may be more likely to be able to provide desired computer-implemented services due to improved access to computing resources.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated, and/or (vii) generate snapshots for the AI model as it is updated over time.

In order to obtain a trained AI model instance, AI model manager 104 may obtain an AI model and a training dataset. The training dataset may be obtained through multiple data sources 100. Data sources 100 may include any number of data sources (e.g., 100A, 100N). As previously mentioned, an AI model may be used for recommending products to customers; that is, predicting which products and/or services may meet needs of a customer. In this example, the AI model may be a deep learning model type and data sources may include questionnaires completed by the customer, past purchases completed by the customer, online activity of the customer, etc. A training dataset may be created, for example, by collecting information about customers and products purchased by the customers that were reviewed favorably by the customers. The training dataset may then be used to train an instance of the AI model.

Further, in order to obtain an inference from the trained AI model instance, other data may be collected from the same data sources 100 or another data source. Continuing with the above example, another data source 100 may be a questionnaire filled out by the customer. The ingest dataset may include answers to questions regarding interests and/or needs of the customer. An inference (e.g., a recommendation for a product based on the needs of the customer) may be obtained from the trained instance of the AI model after ingesting the ingest dataset, and the inference may be distributed to inference consumers 102.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections). However, an incremental snapshot of an AI model at a given time may only include a subset of the information stored in the full snapshot (e.g., only the neuron weights that have changed since the last full snapshot, data values from a training data set used to generate the snapshot through re-training a prior instance of the AI model). Using incremental snapshots may improve efficiency as they may use fewer computing resources (e.g., data transfer and/or data storage) than a full snapshot. Generating snapshots of the AI model over time may allow for the impact of poisoned data to be computationally efficiently quantified and/or mitigated.

To manage the impact of poisoned inferences on inference consumers 102, AI model manager 104 may: (i) make an identification that a poisoned inference has been provided to a first inference consumer, the poisoned inference being generated by a poisoned AI model, (ii) identifying a second AI model that provides inferences of a same type as a type of the poisoned inference, (iii) obtaining a quantification of an impact of the poisoned inference based on first use of the poisoned inference by the first inference consumer and second use of at least one inference generated by the second AI model by a second inference consumer, and/or (iv) determining whether to remediate the poisoned inference based on the quantification. If the poisoned inference is to be remediated, AI model manager 104 may perform an action set to mitigate impact of the poisoned inference on the first inference consumer.

The quantification may indicate an extent of deviation between the first use and the second use. To obtain the quantification, AI model manager 104 may: (i) obtain, based on the first use, a first sub-quantification indicating an impact on the first inference consumer, (ii) obtain, based on the second use, a second sub-quantification indicating an impact on the second consumer, and/or (iii) obtain a difference between the first sub-quantification and the second sub-quantification to obtain the quantification.

The second AI model may be believed to not be poisoned at the time of generating the second inference. In addition, the first use and the second use may be the same type of use.

For example, the poisoned inference may include first recommendations of a first product for a first group of customers. The first use may include providing the first recommendation to the first group of the customers. The first use may also include: (i) an indication of how many customers of the first group of the customers purchased the first product, (ii) an indication of how many customers of the first group of the customers returned the first product after purchasing the first product (e.g., which may indicate that the first product did not meet the needs of the first group of the customers), and/or (iii) other information.

The second inference may include a second recommendations of a second product for a second group of customers. The second use may include providing the second recommendation to the second group of the customers. The second use may also include (i) an indication of how many customers of the second group of the customers purchased the second product, (ii) an indication of how many customers of the second group of the customers returned the second product after purchasing the second product (e.g., which may indicate that the second product did not meet the needs of the second group of the customers), and/or (iii) other information.

Consider a scenario in which the first use indicates that 50% of the first group of the customers returned the first product, and the second use indicates that 10% of the second group of the customers returned the second product. Therefore, a deviation may exist between the first use and the second use which may indicate that the poisoned inference impacted the inference consumer that provided the recommendations to the first group of the customers.

Determining whether to remediate the poisoned inference may include comparing the quantification to a quantification threshold (e.g., based on individual inference consumers 102). If the quantification meets the quantification threshold, the poisoned inference may be remediated. If the quantification does not meet the quantification threshold, the poisoned inference may not be remediated.

Remediating the poisoned inference may include: (i) obtaining a replacement inference using an updated AI model instance, (ii) deleting the identified poisoned inference, (iii) notifying inference consumers 102 of the poisoned inference, (iv) transmitting the replacement inference to inference consumers 102, and/or (v) remediating a decision made by inference consumers 102 (and/or another entity) based on the poisoned inference.

By doing so, embodiments disclosed herein may conserve computing resources by determining whether to remediate poisoned inferences based on an impact the poisoned inferences had on use of the poisoned inferences by inference consumers 102.

Inference consumers 102 may include any number of inference consumers (e.g., 102A, 102N). Inference consumers 102 may include businesses, individuals, or computers that may use the inference data to improve and/or automate decision-making. The inference consumer may offer computer-implemented services for businesses, for example, in order to determine which products may appeal to a potential customer.

When performing its functionality, one or more of AI model manager 104, data sources 100, and inference consumers 102 may perform all, or a portion, of the methods and/or actions shown in FIGS. 2A-3B.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100, and inference consumers 102).

While illustrated in FIG. 1 as included a limited number of specific components, a system in accordance with an embodiment may include fewer, additional, and/or different components than those illustrated therein.

The system described in FIG. 1 may be used to reduce the computational cost for mitigating the impact of poisoned inferences on inference consumers. The following operations described in FIGS. 2A-2D may be performed by the system in FIG. 1 when providing this functionality.

Figure 2A:
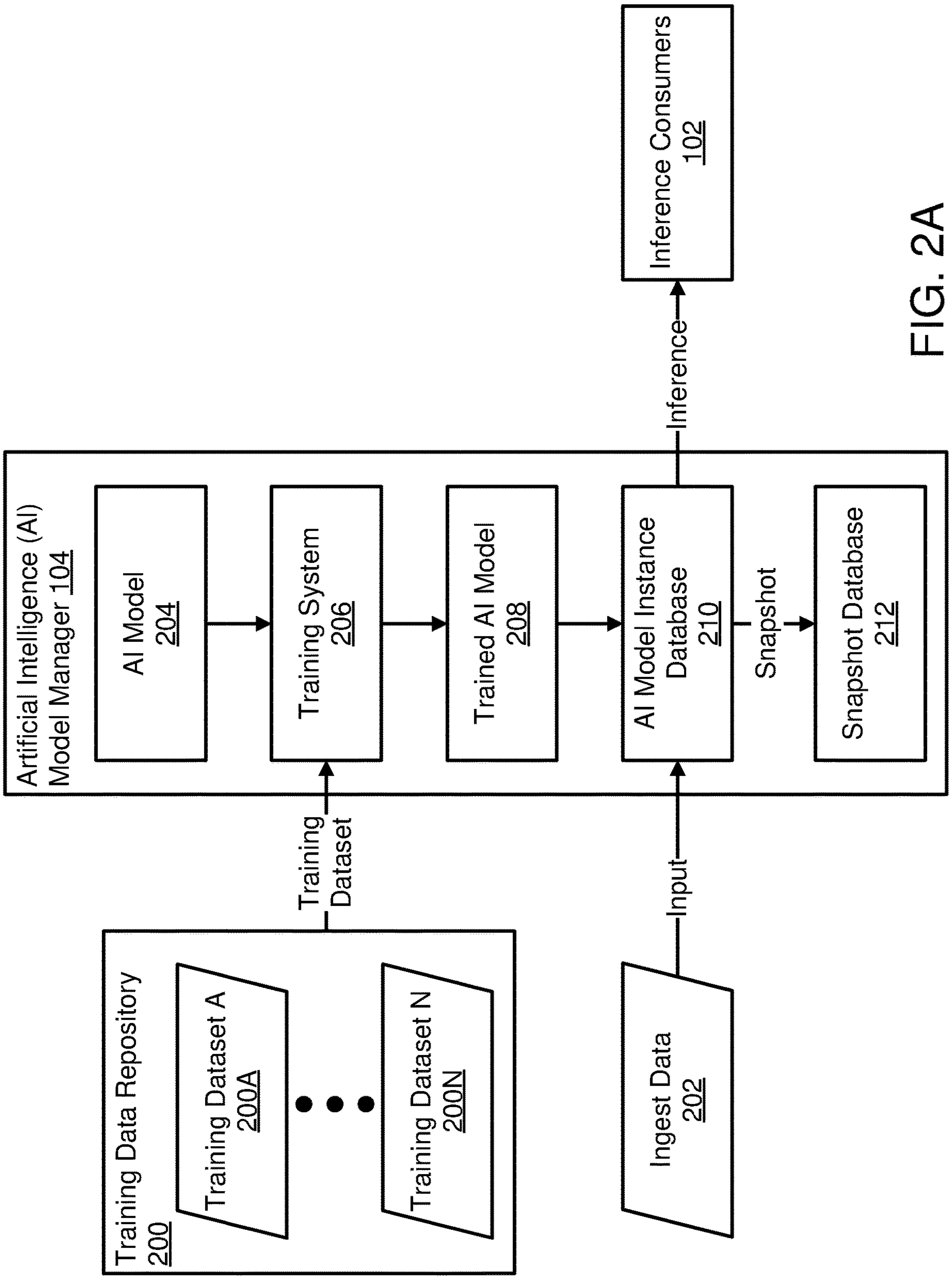
FIG. 2A shows a data flow diagram illustrating an AI model manager in accordance with an embodiment.

FIG. 2A shows a data flow diagram of an AI model manager in accordance with an embodiment. The data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume product recommendations for customers. Product recommendation services may be provided by using AI models that have been trained to identify products that may meet the needs of certain consumers.

As discussed with respect to FIG. 1, training data used for training AI models may be obtained from any number of data sources 100 (not shown in FIG. 2A). Training data may be stored in training data repository 200. Training data repository 200 may include any number of training datasets (e.g., 200A, 200N).

Training data repository 200 may include data that defines an association between two pieces of information (e.g., which may be referred to as "labeled data"). For example, in the context of product recommendation services, training data repository 200 may include product recommendations associated with customers that were received favorably by the customers (e.g., products that were purchased and not returned). The relationship between the product recommendations and the customers may be a portion of labeled data. Any of the training datasets (e.g., 200A) from training data repository 200 may relate the recommended products to information related to the customer (e.g., name, purchase history, internet activity) thereby including any number of portions of labeled data.

Data sources 100 may also provide ingest data 202. Ingest data 202 may be a portion of data for which an inference is desired to be obtained. Ingest data 202 may not be labeled data and, thus, an association for ingest data 202 may not be known. For example, returning to the product recommendation services example, ingest data 202 may include customers for which products are to be recommended. Ingest data 202 may be used by AI model manager 104 to identify products that are predicted to meet the needs of the customers (e.g., through ingestion by an AI model).

AI model manager 104 may provide inferences for ingest data, such as ingest data 202. To do so, AI model manager 104 may include AI model 204 and training system 206. AI model 204 may be trained by training system 206 using a training dataset (e.g., training dataset 200A). For example, training system 206 may employ supervised learning using a training dataset that includes sample input data along with its desired output data (e.g., the pair being labeled data).

Once trained, trained AI model 208 may attempt to map the sample input data to the desired output data, as well as make inferences based on ingest data 202 that may differ from the sample data used to train trained AI model 208. In the context of the product recommendation services example, trained AI model 208 may be a trained AI model, trained to map the characteristics associated with a customer to a product recommendation for the customer.

To provide product recommendation services, AI model manager 104 may train any number of AI models which may generate inferences usable to identify products to recommend to customers. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to recommend products for customers included in ingest data 202.

Once selected, ingest data 202 may be input to a trained AI model instance to generate an inference. AI model manager 104 may obtain the inference, which may be provided to inference consumers 102. In the product recommendation example, characteristics of a customer may be input to the trained AI model, a product recommendation may be obtained by AI model manager 104, and the product recommendation may be provided to an inference consumer.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212 and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, information regarding the training datasets used to train the AI model instance, and/or other information.

Thus, as illustrated in FIG. 2A, the system of FIG. 1 may provide inferences using trained AI models. However, as noted above, if the trained AI models are poisoned then the trained AI models may no longer be trustworthy for inference generation. To manage inference generation when poisoned trained AI models are identified, the snapshots of snapshot database 212 may be used to computationally efficiently restore inference generation functionality, manage tainted inferences, and/or otherwise mitigate the impact of poisoned training data.

Figure 2B:
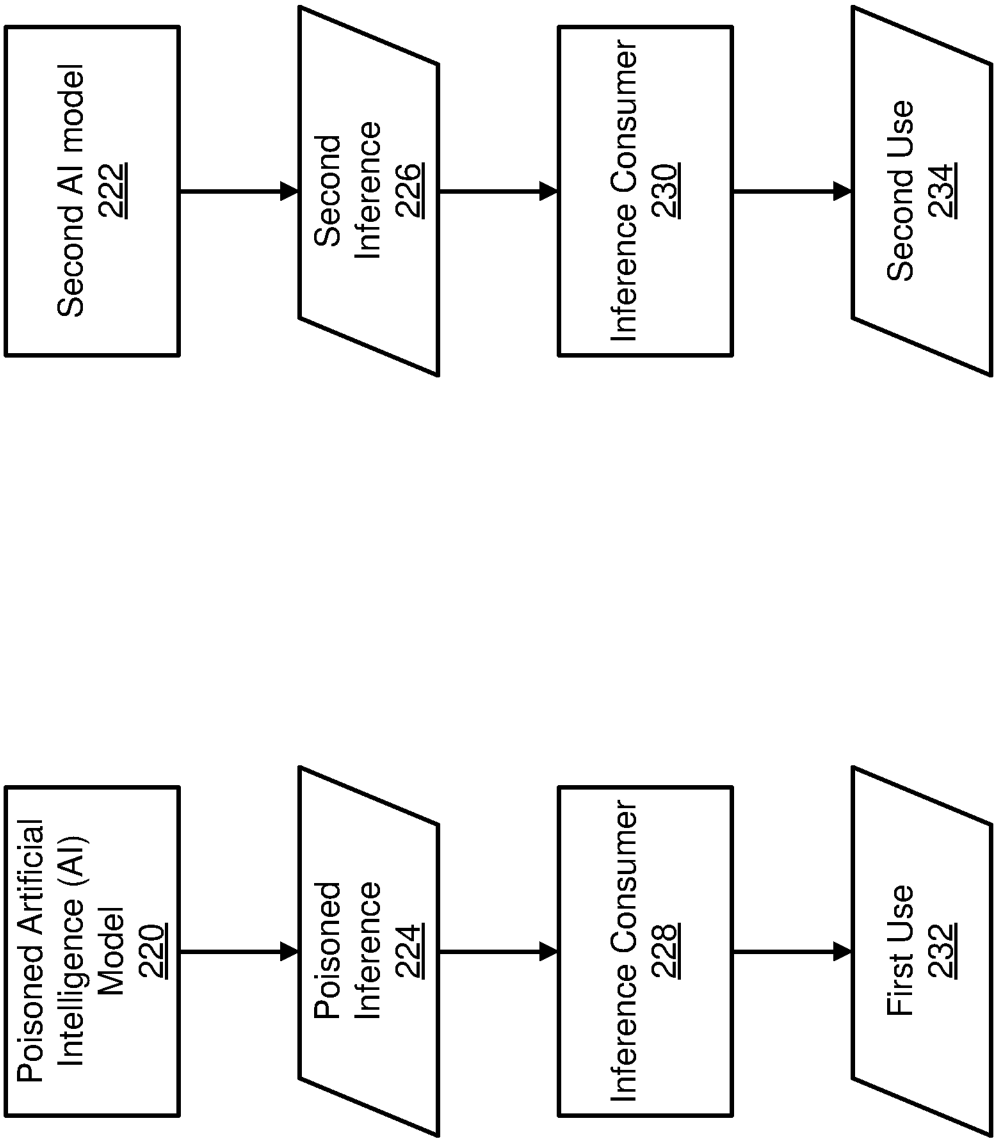
FIG. 2B shows a data flow diagram illustrating a poisoned AI model and a second AI model generating inferences usable by inference consumers in accordance with an embodiment.

Turning to FIG. 2B, consider a scenario in which an AI model instance from AI model instance database 210 (described in FIG. 2A) is trained, at least partially, using poisoned training data to obtain poisoned AI model 220. Poisoned training data may include labeled data presented to AI model manager 104 (and/or any other entity responsible for training AI model instances) as legitimate training data from a trusted entity. However, the poisoned training data may originate from an unauthorized entity and the content included in the poisoned training data may differ from representations regarding the content made by the unauthorized entity.

Therefore, poisoned AI model 220 may generate poisoned inference 224. Poisoned inference 224 may include, for example, a product recommendation for a first customer (e.g., a consumer of products offered by inference consumer 228). The ingest data used to generate poisoned inference 224 may include information about the first customer (e.g., purchase history, online activity, questionnaire responses). The ingest data may be fed into poisoned AI model 220 and the output from poisoned AI model 220 may include the product recommendation. Poisoned inference 224 may be provided to inference consumer 228.

Inference consumer 228 may be similar to any of inference consumers 102 described in FIG. 1. Inference consumer 228 may provide poisoned inference 224 to the first customer. The first customer may perform actions in response to obtaining the product recommendation. For example, the first customer may: (i) purchase the product, (ii) not purchase the product, (iii) purchase the product and subsequently return the product, and/or (iv) purchase the product and keep the product.

Once poisoned inference 224 is identified, it may be determined whether to remediate poisoned inference 224. Remediating poisoned inference 224 may include: (i) deleting poisoned inference 224, (ii) notifying the first customer (and/or other entities) of poisoned inference 224. (iii) reverting poisoned AI model 220 to a previous version of the AI model that is not poisoned and re-training the AI model using training data that is not poisoned, (iv) re-training poisoned AI model 220 to reduce the impact of the poisoned training data, (v) remediating decisions made based on poisoned inference 224, and/or (vi) other actions. Such actions may consume an undesirable quantity of computing resources, energy, network bandwidth, etc.

To determine whether to remediate poisoned inference 224, a quantification of an extent of an impact of poisoned inference 224 on inference consumer 228 may be identified. If the quantification exceeds a quantification threshold, poisoned inference 224 may be remediated. If the quantification does not exceed the quantification threshold, computing resources may be conserved by not remediating poisoned inference 224.

To do so, a second inference obtained by second AI model 222 may be identified, second AI model 222 being a different AI model than poisoned AI model 220. Second AI model 222 may be believed to not be a poisoned AI model instance and may generate second inference 226, which also may be believed to not be a poisoned inference.

Second AI model 222 may be believed to be not poisoned when second inference 226 is generated by second AI model 222. Second AI model 222 may be believed to not be poisoned due to an absence of identified poisoned training data being used to train second AI model 222. Therefore, no inferences generated by second AI model 222 may be flagged as poisoned or potentially poisoned and/or an investigation into the possible poisoning of second AI model 222 may return no evidence of poisoning of second AI model 222.

Second inference 226 may include, for example, a product recommendation for a second customer (e.g., a consumer of products offered by inference consumer 230). The ingest data used to generate second inference 226 may include information about the second customer (e.g., purchase history, online activity, questionnaire responses). The ingest data may be fed into second AI model 222 and the output from second AI model 222 may include the product recommendation. Second inference 226 may be provided to inference consumer 230.

Inference consumer 230 may be similar to any of inference consumers 102 described in FIG. 1. Inference consumer 230 may provide second inference 226 to the second customer. The second customer may perform actions in response to obtaining the product recommendation. For example, the second customer may: (i) purchase the product, (ii) not purchase the product, (iii) purchase the product and subsequently return the product, and/or (iv) purchase the product and keep the product.

Second AI model 222 may generate inferences (e.g., second inference 226) of a same type as a type of poisoned inference 224. The type may be based on labels from training data used to train second AI model 222. The training data set may include a set of data and corresponding labels for the data. The data may include, for example, a series of identifiers of customers and the corresponding labels may include product recommendations for the customers. Therefore, the type may include a recommendation for a consumer of products offered by inference consumer 228 and inference consumer 230. Thus, both poisoned inference 224 and second inference 226 may include recommendations for products based on characteristics of consumers and the products may be similar types of products (e.g., hardware devices).

For example, inference consumer 228 may recommend computer hardware to customers based on the business needs and/or business goals of the customers. The first customer may fill out a questionnaire regarding computing processes desired to be completed and inference consumer 228 may use the questionnaire (along with other data) to recommend hardware to purchase to facilitate completion of the desired computing processes.

Therefore, an impact of poisoned inference 224 on inference consumer 228 may be determined by comparing use of poisoned inference 224 to use of second inference 226. Use of poisoned inference 224 may be represented by first use 232. First use 232 may include: (i) an intended use for poisoned inference 224, (ii) an indication of how any number of customers responded to recommendations based, at least in part, on poisoned inference 224, and/or (iii) other information.

The intended use for poisoned inference 224 may include presenting the recommendations to customers to encourage the customers to purchase products based on the recommendations.

The intended use for poisoned inference 224 may also include feeding poisoned inference 224 into a third AI model as ingest data and obtaining an output from the third AI model based, at least in part, on poisoned inference 224. Poisoned AI model 220 and the third AI model (not shown) may, therefore, make up at least a portion of a first chain of AI models. Each AI model of the first chain of the AI models may generate inferences that are subsequently used as ingest data for other AI models of the first chain of the AI models. Consequently, introduction of poisoned inferences into the first chain of the AI models may impact all other AI models (that obtain ingest data that includes the poisoned inferences) included in the first chain of the AI models.

For example, the poisoned inference may include a prediction for a computing resource requirement (processor speed, storage capacity, etc.) for a customer. The predicted computing resource requirement may be fed into the third AI model, the third AI model being trained to generate product recommendations (e.g., hardware components) to fulfil the computing resource requirement. Consequently, if a poisoned inference is used at a start of a chain, the impact may grow throughout the chain. Further, it will be appreciated that along the chain branches may form (e.g., when multiple AI models use poisoned inferences as input and/or a basis for training).

To expand on the previous example, if the first prediction discussed above results in a system being under provisioned, the resulting deployed system may lack the resource capacity to perform subsequent desirable activities such as reindexing of databases for optimization, in addition to an initially desired purpose such as inferencing with AI models.

The indication of how the any number of the customers responded to the recommendations based on poisoned inference 224 may include: (i) a first indication of how many customers purchased products based on the recommendations, (ii) a second indication of how many customers returned products purchased based on the recommendations, and/or (iii) other information. The first indication and the second indication may be represented as percentages and/or in other ways.

Use of second inference 226 may be represented as second use 234. First use 232 and second use 234 may be the same type of use. Therefore, second use 234 may include: (i) an intended use for second inference 226, (ii) an indication of how any number of customers responded to recommendations based, at least in part, on second inference 226, and/or (iii) other information.

The intended use for second inference 226 may be to present the recommendations to customers to encourage the customers to purchase products based on the recommendations.

The intended use for second inference 226 may also include feeding second inference 226 into a fourth AI model as ingest data and obtaining an output from the fourth AI model based, at least in part, on second inference 226. Second AI model 222 and the fourth AI model (not shown) may, therefore, make up at least a portion of a second chain of AI models. Each AI model of the second chain of the AI models may generate inferences that are subsequently used as ingest data for other AI models of the second chain of the AI models.

The indication of how the any number of the customers responded to the recommendations based on second inference 226 may include: (i) a third indication of how many customers purchased products based on the recommendations, (ii) a fourth indication of how many customers returned products purchased based on the recommendations, and/or (iii) other information. The third indication and the fourth indication may be represented as percentages and/or in other ways.

Figure 2C:
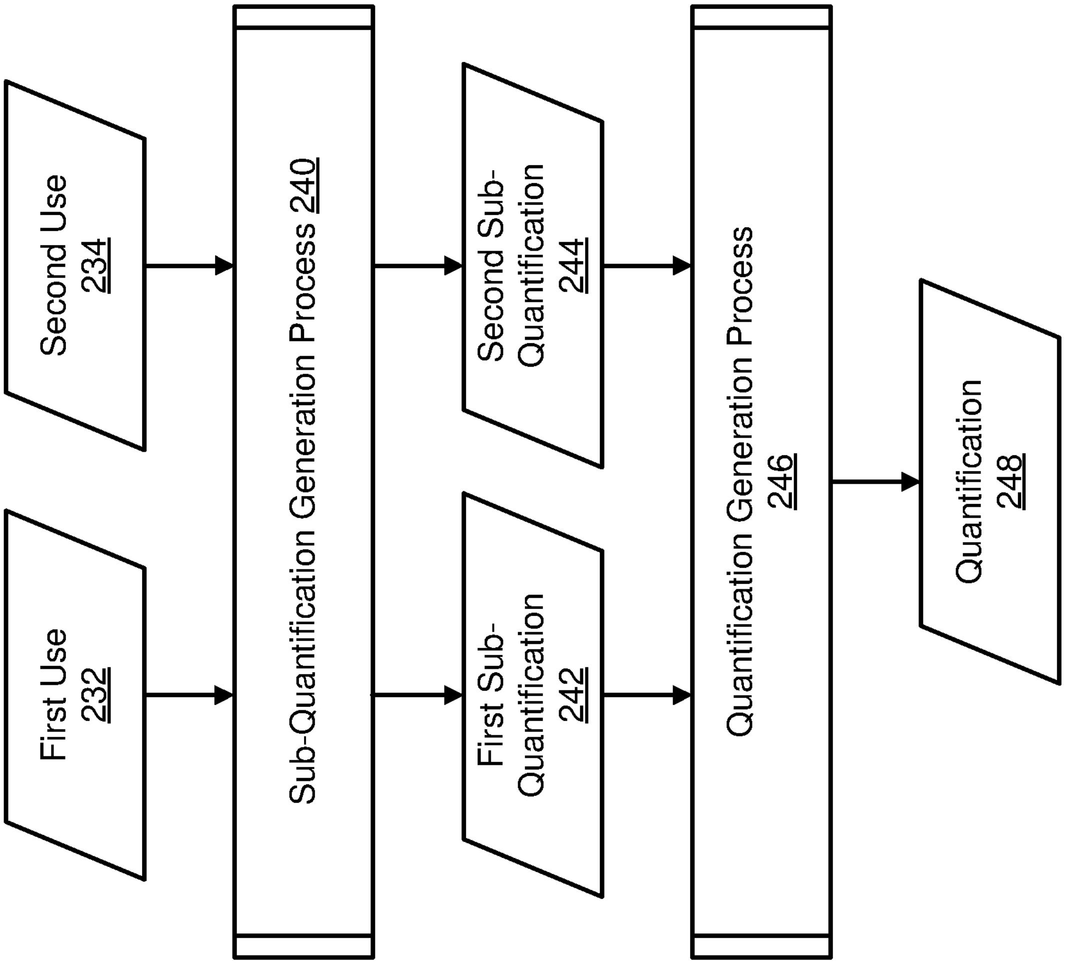
FIG. 2C shows a data flow diagram illustrating quantification of an impact of a poisoned inference on an inference consumer in accordance with an embodiment.

Turning to FIG. 2C, first use 232 and second use 234 may be compared to determine an extent of an impact of poisoned inference 224 on inference consumer 228 (not shown). As first use 232 and second use 234 are the same type of use (e.g., both include recommendations for similar types of products to similar types of consumers), differences in the outcome of the recommendations (e.g., whether customers purchase the products in the recommendations) may indicate an extent of an impact of poisoned inference 224 on inference consumer 228.

To do so, first use 232 and second use 234 may be used for sub-quantification generation process 240. Sub-quantification generation process 240 may include obtaining first sub-quantification 242 based on first use 232 and second sub-quantification 244 based on second use 234.

First sub-quantification 242 may indicate an impact of poisoned inference 224 on inference consumer 228. First sub-quantification 242 may include, for example, a percentage of product recommendations that were successful following use of poisoned inference 224. A product recommendation may be considered successful, for example, if a customer who received the recommendation purchased the product included in the recommendation. The success of the product recommendation may also be based, at least in part, on how often customers returned the product following purchase of the product.

For example, first sub-quantification 242 may indicate that 25% of customers provided with product recommendations based on poisoned inference 224 purchased and retained (e.g., did not return) products included in the product recommendations.

Second sub-quantification 244 may indicate an impact of second inference 226 on inference consumer 230. Second sub-quantification 244 may include, for example, a percentage of product recommendations that were successful following use of second inference 226. A product recommendation may be considered successful, for example, if a customer who received the recommendation purchased the product included in the recommendation. The success of the product recommendation may also be based, at least in part, on how often customers returned the product following purchase of the product.

For example, second sub-quantification 244 may indicate that 56% of customers provided with product recommendations based on second inference 226 purchased and retained (e.g., did not return) products included in the product recommendations.

First sub-quantification 242 and second sub-quantification 244 may be used for quantification generation process 246. Quantification generation process 246 may include obtaining a difference between first sub-quantification 242 and second sub-quantification 244 to obtain quantification 248. Quantification 248 may include the difference and/or other information. For example, quantification 248 may indicate that there is a 31% difference between the impact of poisoned inference 224 on inference consumer 228 and the impact of second inference 226 on inference consumer 230. Quantification 248 may represent the difference in formats other than percentages without departing from embodiments disclosed herein.

Quantification 248 may be compared to a quantification threshold (not shown). The quantification threshold may indicate an amount of deviation between first sub-quantification 242 and second sub-quantification 244 that is considered to require remediation. For example, the quantification threshold may indicate that any difference of 20% or more triggers remediation of poisoned inferences.

If quantification 248 meets the quantification threshold, an action set may be performed to remediate poisoned inference 224. If quantification 248 does not meet the quantification threshold, no action may be performed to remediate poisoned inference 224.

Figure 2D:
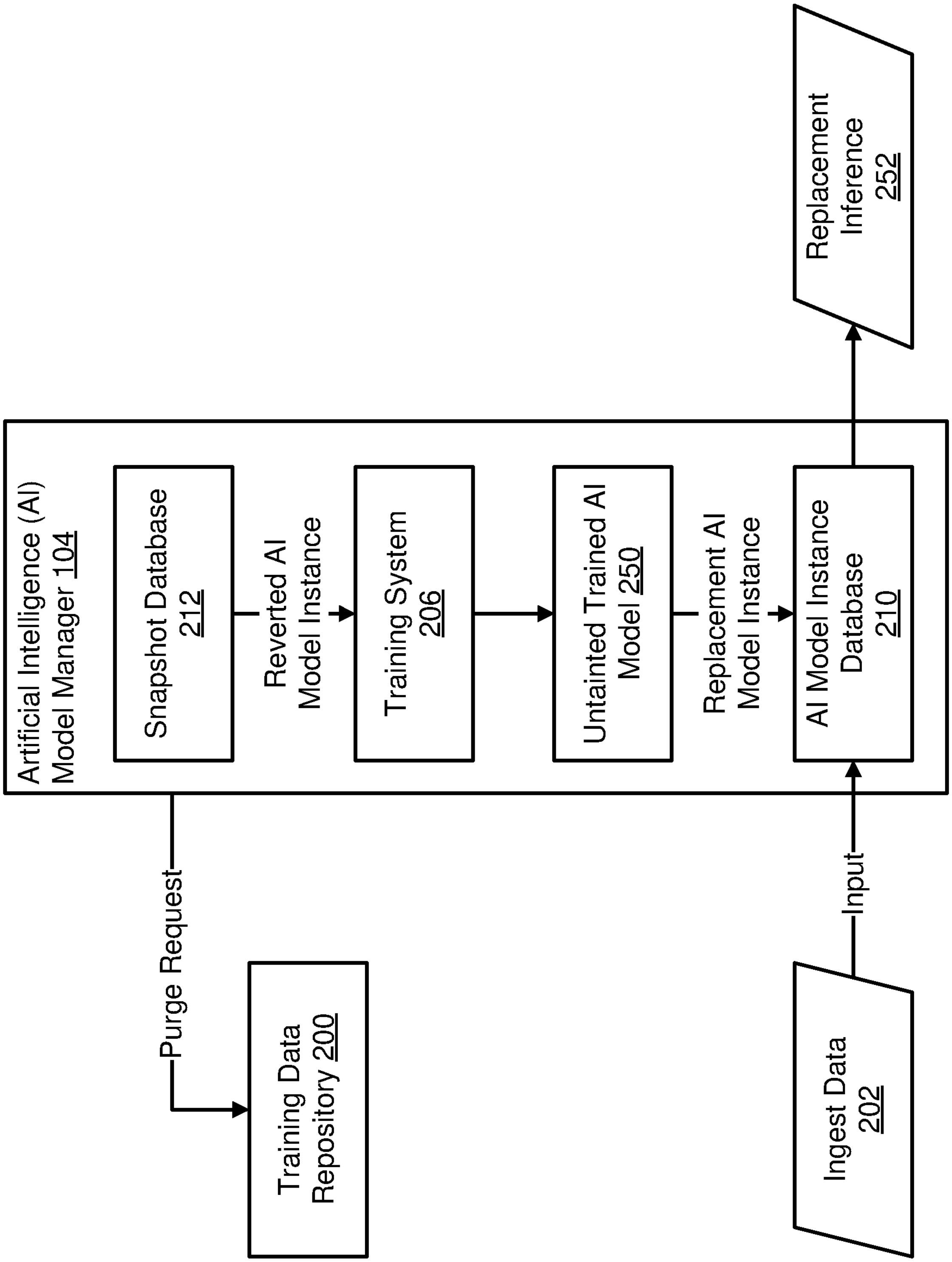
FIG. 2D shows a data flow diagram illustrating an AI model manager remediating a poisoned inference in accordance with an embodiment.

Turning to FIG. 2D, if quantification 248 meets the quantification threshold (not shown), the action set may be performed to remediate poisoned inference 224. To perform the action set, AI model manager 104 may (i) send a purge request to training data repository 200 regarding the poisoned portion of the training dataset, and/or (ii) revert a tainted AI model instance to a previous AI model instance. The previous AI model instance may be a last known good AI model instance, and/or a previous tainted AI model instance trained by poisoned training data. In the case where the AI model instance is tainted, then the tainted AI model instance may later be untrained to eliminate the effect of the poisoned training data.

Rather than reverting to a last known good (e.g., unpoisoned) AI model instance, the tainted AI model may be reverted to a previous tainted (e.g., poisoned) instance of the AI model and the previous tainted instance of the AI model may be un-trained. Doing so may remediate the impact of poisoned training data without performing a re-training process with all available unpoisoned training data, thereby conserving computing resources.

A snapshot of a last known good AI model instance may be stored in snapshot database 212. The last known good AI model instance may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., re-training/updating may not remove the effect of the poisoned training data on the future operation of the trained AI model). The last known good AI model instance may be the last version of the AI model that is trained without using the poisoned training data for updating purposes.

However, reverting the AI model may not entirely remove the impact of the poisoned training data from the overall system operation. For example, the poisoned training data may still be present in training data repository 200. To reduce the impact of poisoned training data, a purge request may prompt the deletion of a poisoned portion of a training dataset from training data repository 200. Any number of poisoned portions of training data may be removed from training data repository 200 to create an updated training data repository (not shown). The updated training data repository may not include any portions of poisoned training data. An updated training dataset from the updated training data repository may be used to train an untainted AI model instance that is trustworthy for inference generation.

To obtain untainted trained AI model 250, training system 206 may use an updated training dataset to train a reverted AI model instance (e.g., a last known good AI model instance). To reduce computational resources during AI model training, the updated training dataset used to train a reverted AI model instance may only include training data not already used to train the reverted AI model instance (e.g., training data input to training system 206 after the poisoned training data). AI model manager may then replace a tainted trained AI model instance stored in AI model instance database 210 with untainted trained AI model 250.

Like removal of the poisoned training data to reduce the impact of the poisoned training data on operation of the system, untainted trained AI model 250 may be used to generate replacement inference 252 for a poisoned inference (e.g., generated by the tainted trained AI model) by ingesting a portion of ingest data 202 (e.g., which may have been used to generate the poisoned inference). Replacement inference 252 may be provided to inference consumer 228 and any recommendations provided to customers based on poisoned inference 224 may be replaced and/or otherwise remediated.

In an embodiment, the one or more entities performing the operations shown in FIGS. 2A-2D are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3A:
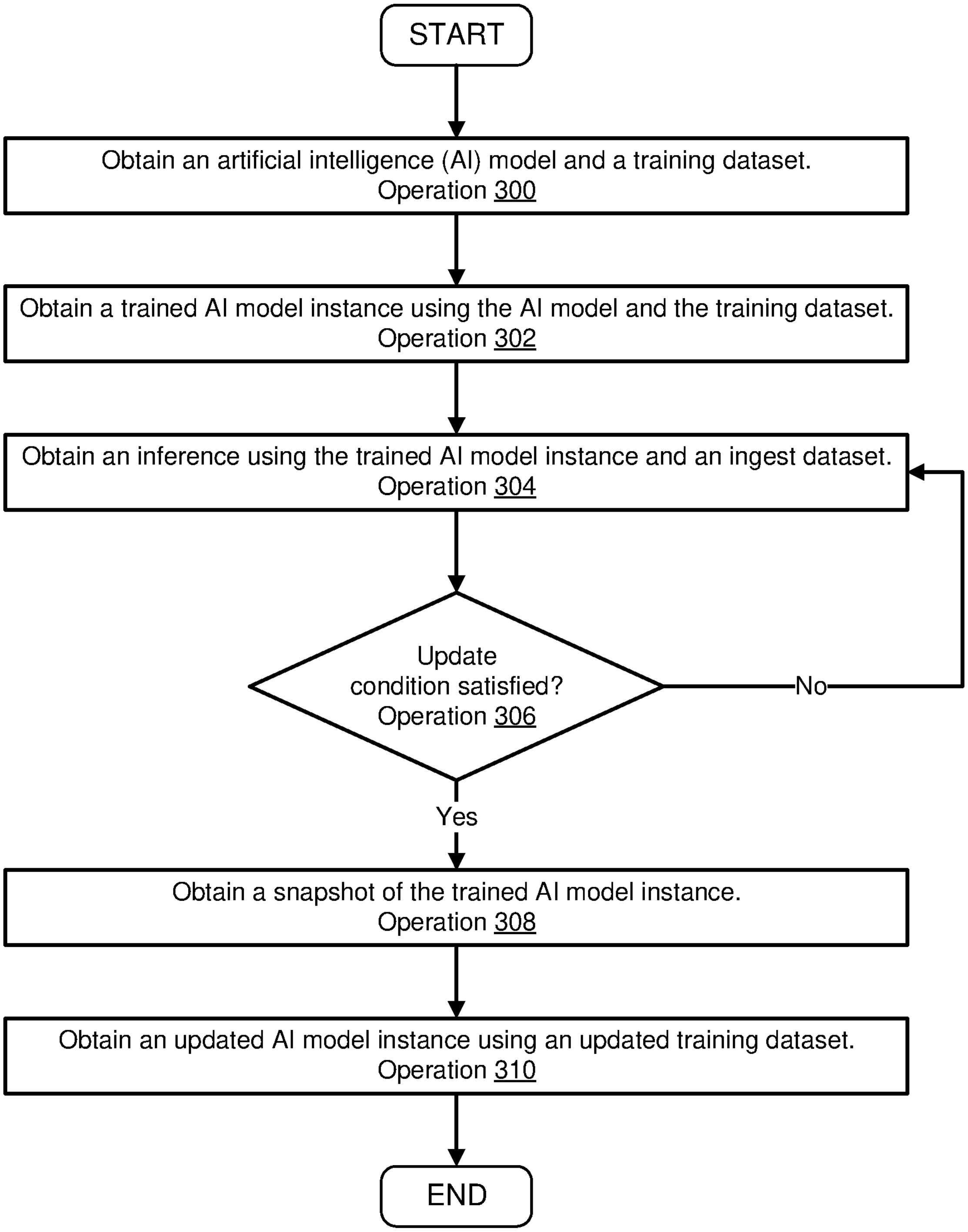
FIG. 3A shows a flow diagram illustrating a method of updating an AI model instance in accordance with an embodiment.
Figure 3B:
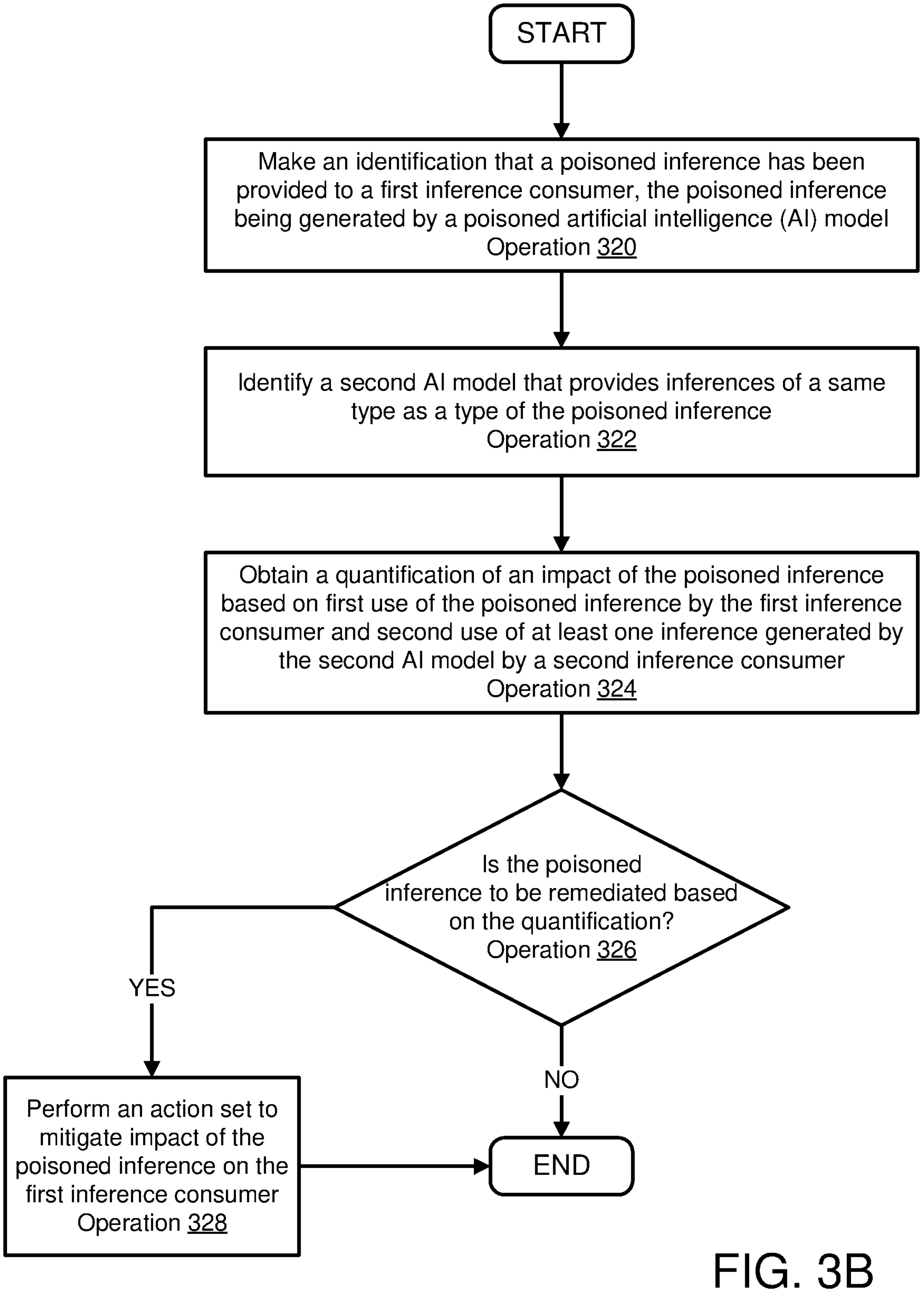
FIG. 3B shows a flow diagram illustrating a method of determining whether to remediate a poisoned inference in accordance with an embodiment.

As discussed above, the components of FIG. 1 may perform various methods to manage AI models. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a deep neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a multi-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data whose labels are linearly correlated with the selected features, and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data or unlabeled data. Training data included in the training dataset may be processed, cleansed and/or evaluated for quality in order to prepare the training dataset for use in training AI models.

At operation 302, a trained AI model instance may be obtained using the AI model and the training dataset. The trained AI model may be obtained by training the AI model to relate pieces of data (e.g., an input and an output) from the training dataset using a training system, such as the one in FIGS. 2A-2D. To do so, the training dataset and the AI model may be input to the training system.

The training system may employ machine learning techniques such as supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model manager which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data, and/or other characteristics to corresponding conditions that, if met, indicate that the update condition is satisfied.

For example, the update condition may be satisfied if (i) a sufficient amount of new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, and/or (iv) metadata identifying data sources from which training data has been collected.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions) and the parameters may be stored. However, as the AI model is evolved, the structure may be stored as part of the snapshot by merely referencing the existing stored architecture and storing the changed parameters.

The parameters may include, for example, a first element from a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing: (i) an association between the poisoned AI model and the poisoned inference, (ii) an identifier for the ingest data used to generate the poisoned inference, (iii) an identifier for the inference consumer that has consumed (or will consume) the poisoned inference, and/or (iv) other metadata (e.g., a time stamp indicating when the inference was generated). Any number of snapshots of AI model instances may be stored in a snapshot database.

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, and/or (iii) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance is obtained using an updated training dataset. The updated AI model instance may be obtained by further training (e.g., updating) the trained AI model instance to relate pieces of data from an updated training dataset using a training system. The updated training dataset may include newly acquired training data (e.g., training data that has not already been used to train the trained AI model instance).

The training system may employ machine-learning methods such as incremental learning, which may allow an additional training step as new training data becomes available, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data.

The method may end following operation 310.

Turning to FIG. 3B, a flow diagram illustrating a method of managing an impact of poisoned inferences on inference consumers in accordance with an embodiment is shown. The method may be performed by a data processing system, and/or another device.

At operation 320, an identification is made that a poisoned inference has been provided to a first inference consumer, the poisoned inference being generated by a poisoned AI model. The identification may be made by: (i) receiving the identification from another entity. (ii) reading the identification from storage, and/or (iv) generating the identification. The identification may be generated, for example, by analyzing training data and/or operation of entities from which the training data may be obtained.

At operation 322, a second AI model is identified that provides inferences of a same type as a type of the poisoned inference. The second AI model may be identified by: (i) identifying a type of the poisoned inference, (ii) performing a lookup process using an AI model lookup table and the type of the poisoned inference as a key for the AI model lookup table, and/or (iii) obtaining the second AI model as an output from the AI model lookup table.

For example, the type of the poisoned inference may include computer hardware component recommendations for customers. The AI model lookup table may include any number of AI models and each AI model of the any number of AI models may be associated with a type of inference.

Identifying the type of the poisoned inference may include: (i) reading the type of the poisoned inference from storage, (ii) receiving the type of the poisoned inference in the form of a message from another entity, (iii) generating the type of the poisoned inference, and/or (iv) other methods.

Generating the type of the poisoned inference may include: (i) obtaining training data used to train the poisoned AI model and/or any number of inferences previously generated by the poisoned AI model, (ii) feeding the training data and/or inferences into a third AI model trained to classify types of inferences based on inferences generated by any number of additional AI models, (iii) obtaining the type of the poisoned inference as output from the third AI model, and/or (iv) other methods.

Identifying the second AI model may also include: (i) reading the second AI model from storage, (ii) receiving the second AI model from another device, and/or (iii) generating the second AI model, for example by programming a data processing system and/or another device.

At operation 324, a quantification of an impact of the poisoned inference is obtained based on first use of the poisoned inference by the first inference consumer and second use of at least one inference generated by the second AI model by a second inference consumer. Obtaining the quantification may include: (i) obtaining, based on the first use of the poisoned inference, a first sub-quantification indicating an impact on the first inference consumer, (ii) obtaining, based on the second use of the at least one inference, a second sub-quantification indicating an impact on the second inference consumer, and/or (iii) obtaining a difference between the first sub-quantification and the second sub-quantification to obtain the quantification.

Obtaining the quantification may also include: (i) reading the quantification from storage, (ii) receiving the quantification from another entity throughout the distributed environment that is responsible for obtaining quantifications, and/or (iii) other methods.

Obtaining the first sub-quantification may include: (i) reading the first sub-quantification from storage, (ii) receiving the first sub-quantification from another entity responsible for generating the first sub-quantification, (iii) generating the first sub-quantification, and/or (iv) other methods.

Generating the first sub-quantification may include: (i) obtaining the first use of the poisoned inference from the first inference consumer, (ii) performing an analysis of the first use to quantify an impact of the poisoned inference on the first inference consumer, (iii) treating the quantified impact as the first sub-quantification, and/or (iv) other methods.

Performing the analysis of the first use may include: (i) extracting data from the first use related to whether customers purchase (without returning) products based on recommendations from the poisoned inference, (ii) aggregating the data related to whether customers purchase products based on recommendations from the poisoned inference to obtain a numerical representation of the first use, (iii) treating the numerical representation as the quantified impact, and/or (iv) other methods.

Obtaining the second sub-quantification may include: (i) reading the second sub-quantification from storage, (ii) receiving the second sub-quantification from another entity responsible for generating the second sub-quantification, (iii) generating the second sub-quantification, and/or (iv) other methods.

Generating the second sub-quantification may include: (i) obtaining the second use of the second inference from the second inference consumer, (ii) performing an analysis of the second use to quantify an impact of the second inference on the second inference consumer, (iii) treating the quantified impact as the second sub-quantification, and/or (iv) other methods.

Performing the analysis of the second use may include: (i) extracting data from the second use related to whether customers purchase (without returning) products based on recommendations from the second inference, (ii) aggregating the data related to whether customers purchase products based on recommendations from the second inference to obtain a numerical representation of the second use, (iii) treating the numerical representation as the quantified impact, and/or (iv) other methods.

Obtaining the difference between the first sub-quantification and the second sub-quantification may include: (i) obtaining a first numerical representation of the first sub-quantification, (ii) obtaining a second numerical representation of the second sub-quantification, (iii) performing a subtraction operation using the first numerical representation and the second numerical representation to obtain the difference, and/or (iv) other methods.

Obtaining the difference may also include: (i) reading the difference from storage, (ii) providing the first sub-quantification and the second sub-quantification to another entity responsible for generating the difference and obtaining the difference from the another entity, and/or (iii) other methods.

At operation 326, it is determined whether the poisoned inference is to be remediated based on the quantification. Determining whether the poisoned inference is to be remediated may include: (i) identifying a quantification threshold for the first inference consumer, (ii) comparing the quantification to the quantification threshold, (iii) if the quantification meets the quantification threshold, concluding that the poisoned inference is to be remediated, and/or (iv) other methods.

Identifying the quantification threshold for the first inference consumer may include: (i) reading the quantification threshold from storage, (ii) receiving the quantification threshold from another entity (e.g., the first inference consumer) in the form of a transmission over a communication system, (iii) generating the quantification threshold, and/or (iv) other methods.

Comparing the quantification to the quantification threshold may include: (i) identifying a numerical quantity associated with the quantification, (ii) identifying a numerical quantity associated with the quantification threshold. (iii) determining whether the numerical quantity associated with the quantification is greater than or equal to the numerical quantity associated with the quantification threshold, and/or (iv) other methods.

Comparing the quantification to the quantification threshold may also include providing the quantification and the quantification threshold to another entity responsible for comparing the quantification to the quantification threshold and receiving a notification in response indicating whether the quantification meets the quantification threshold.

If the poisoned inference is to be remediated based on the quantification, the method may proceed to operation 328. If the inference is not to be remediated based on the quantification, the method may end following operation 326.

At operation 328, an action set is performed to mitigate impact of the poisoned inference on the inference consumer. Performing the action set may include: (i) deleting the poisoned inference, (ii) notifying the inference consumer (and/or any other entity) of the poisoned inference, (iii) providing the replacement inference to the inference consumer, and/or (v) remediating a decision made by the inference consumer (and/or another entity) based on the poisoned inference. For example, a poisoned inference may cause the inference consumer to not fulfill a request made by a customer of the downstream consumer. Remediating the poisoned inference may include, in this example, fulfilling the request from the customer.

In addition, performing the action set may include investigating an impact of the poisoned inference (and/or the poisoned AI model) on the overall system. For example, the impact of the poisoned inference (and/or the poisoned AI model) on the overall system may include: (i) use of the poisoned inference to train other instances of AI models, (ii) use of the poisoned inference to make decisions, (iii) use of the poisoned AI model to fulfill requests from other inference consumers, and/or (iv) other impacts.

The method may end following operation 328.

Figure 4:
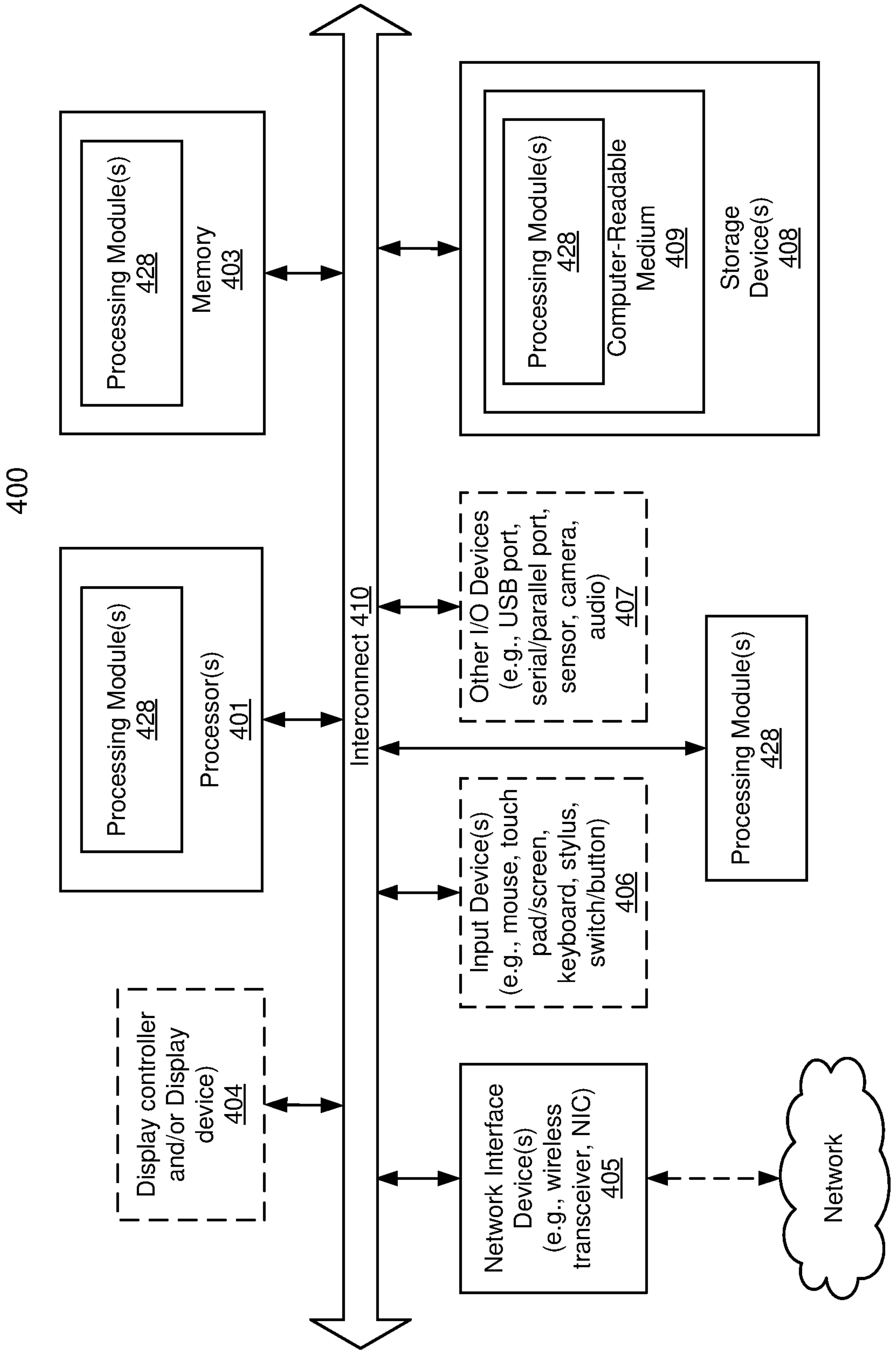
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing inferences generated by artificial intelligence (AI) models, the method comprising:

training a first AI model of the AI models using first training data obtained from one or more data sources;

making an identification, after the first AI model is trained using the first training data, that a poisoned inference of the inferences has been provided to a first inference consumer, the poisoned inference being generated by a poisoned AI model of the AI models, the poisoned AI model being the first AI model, and the identification indicating conclusively that the poisoned inference provided to the first inference consumer is actually poisoned;

reverting, without and instead of re-training the poisoned AI model to remove an effect of the first training data on the poisoned AI model, the poisoned AI model to a last good instance of the poisoned AI model using an AI model snapshot of the last good instance, the first training data being poisoned training data, the AI model snapshot of the last good instance being stored in a snapshot database, and the last good instance being a non-poisoned instance of the poisoned AI model before the non-poisoned instance was trained using the poisoned training data to become the poisoned AI model;

identifying a second AI model of the AI models that provides inferences of a same type as an inference type associated with the poisoned inference, the second AI model being trained using second training data that is different from the first training data;

obtaining a quantification of an impact of the poisoned inference on the first inference consumer based on first use of the poisoned inference by the first inference consumer and second use of at least one inference generated by the second AI model by a second inference consumer;

making a first determination that the quantification is less than a quantification threshold;

making a second determination, based on the first determination, that the poisoned inference is not to be remediated; and in response to the second determination that the poisoned inference is not to be remediated:

doing nothing to remediate the poisoned inference that has already been provided to the first inference consumer by letting the first inference consumer continue using the poisoned inference;

without notifying the first inference consumer that the poisoned inference is poisoned and is generated by the poisoned AI model, and without generating and transmitting a new inference to replace the poisoned inference for the first inference consumer using the last good instance of the poisoned AI model and limited computing resources of a computing device hosting the last good instance of the poisoned AI model.

2. The method of claim 1, wherein the first use and the second use are a same type of use.

3. The method of claim 1, wherein the second AI model is believed to be not poisoned when the at least one inference is generated by the second AI model.

4. The method of claim 1, wherein obtaining the quantification comprises:

obtaining, based on the first use of the poisoned inference, a first sub-quantification indicating an impact on the first inference consumer.

5. The method of claim 4, wherein obtaining the quantification further comprises:

obtaining, based on the second use of the at least one inference, a second sub-quantification indicating an impact on the second inference consumer.

6. The method of claim 5, wherein obtaining the quantification further comprises:

obtaining a difference between the first sub-quantification and the second sub-quantification to obtain the quantification.

7. The method of claim 1, wherein the inference type is based at least on one or more labels from the first training data used to train the poisoned AI model.

8. The method of claim 1, wherein the inference type is associated with a recommendation for a consumer of products offered by the first inference consumer and the second inference consumer.

9. A non-transitory machine-readable medium having instructions stored therein, which when executed by a processor, cause the processor to perform operations for managing inferences generated by artificial intelligence (AI) models, the operations comprising:

training a first AI model of the AI models using first training data obtained from one or more data sources;

making an identification, after the first AI model is trained using the first training data, that a poisoned inference of the inferences has been provided to a first inference consumer, the poisoned inference being generated by a poisoned AI model of the AI models, the poisoned AI model being the first AI model, and the identification indicating conclusively that the poisoned inference provided to the first inference consumer is actually poisoned;

reverting, without and instead of re-training the poisoned AI model to remove an effect of the first training data on the poisoned AI model, the poisoned AI model to a last good instance of the poisoned AI model using an AI model snapshot of the last good instance, the first training data being poisoned training data, the AI model snapshot of the last good instance being stored in a snapshot database, and the last good instance being a non-poisoned instance of the poisoned AI model before the non-poisoned instance was trained using the poisoned training data to become the poisoned AI model;

identifying a second AI model of the AI models that provides inferences of a same type as an inference type associated with the poisoned inference, the second AI model being trained using second training data that is different from the first training data;

obtaining a quantification of an impact of the poisoned inference on the first inference consumer based on first use of the poisoned inference by the first inference consumer and second use of at least one inference generated by the second AI model by a second inference consumer;

making a first determination that the quantification is less than a quantification threshold;

making a second determination, based on the first determination, that the poisoned inference is not to be remediated; and in response to the second determination that the poisoned inference is not to be remediated:

doing nothing to remediate the poisoned inference that has already been provided to the first inference consumer by letting the first inference consumer continue using the poisoned inference;

without notifying the first inference consumer that the poisoned inference is poisoned and is generated by the poisoned AI model, and without generating and transmitting a new inference to replace the poisoned inference for the first inference consumer using the last good instance of the poisoned AI model and limited computing resources of a computing device hosting the last good instance of the poisoned AI model.

10. The non-transitory machine-readable medium of claim 9, wherein the first use and the second use are a same type of use.

11. The non-transitory machine-readable medium of claim 9, wherein the second AI model is believed to be not poisoned when the at least one inference is generated by the second AI model.

12. The non-transitory machine-readable medium of claim 9, wherein obtaining the quantification comprises:

obtaining, based on the first use of the poisoned inference, a first sub-quantification indicating an impact on the first inference consumer.

13. The non-transitory machine-readable medium of claim 12, wherein obtaining the quantification further comprises:

obtaining, based on the second use of the at least one inference, a second sub-quantification indicating an impact on the second inference consumer.

14. A data processing system, comprising:

a processor; and a memory coupled to the processor to store instructions, which when executed by the processor, cause the processor to perform operations for managing inferences generated by artificial intelligence (AI) models, the operations comprising:

training a first AI model of the AI models using first training data obtained from one or more data sources;

making an identification, after the first AI model is trained using the first training data, that a poisoned inference of the inferences has been provided to a first inference consumer, the poisoned inference being generated by a poisoned AI model of the AI models, the poisoned AI model being the first AI model, and the identification indicating conclusively that the poisoned inference provided to the first inference consumer is actually poisoned;

reverting, without and instead of re-training the poisoned AI model to remove an effect of the first training data on the poisoned AI model, the poisoned AI model to a last good instance of the poisoned AI model using an AI model snapshot of the last good instance, the first training data being poisoned training data, the AI model snapshot of the last good instance being stored in a snapshot database, and the last good instance being a non-poisoned instance of the poisoned AI model before the non-poisoned instance was trained using the poisoned training data to become the poisoned AI model;

identifying a second AI model of the AI models that provides inferences of a same type as an inference type associated with the poisoned inference, the second AI model being trained using second training data that is different from the first training data;

obtaining a quantification of an impact of the poisoned inference on the first inference consumer based on first use of the poisoned inference by the first inference consumer and second use of at least one inference generated by the second AI model by a second inference consumer;

making a first determination that the quantification is less than a quantification threshold;

making a second determination, based on the first determination, that the poisoned inference is not to be remediated; and in response to the second determination that the poisoned inference is not to be remediated:

doing nothing to remediate the poisoned inference that has already been provided to the first inference consumer by letting the first inference consumer continue using the poisoned inference;

without notifying the first inference consumer that the poisoned inference is poisoned and is generated by the poisoned AI model, and without generating and transmitting a new inference to replace the poisoned inference for the first inference consumer using the last good instance of the poisoned AI model and limited computing resources of a computing device hosting the last good instance of the poisoned AI model.

15. The data processing system of claim 14, wherein the first use and the second use are a same type of use.

16. The data processing system of claim 14, wherein the second AI model is believed to be not poisoned when the at least one inference is generated by the second AI model.

17. The method of claim 1, wherein the quantification is based on a difference between:

a quantification of a first action performed by the first inference consumer in response to the first use of the poisoned inference by the first inference consumer, and a quantification of a second action performed by the second inference consumer after the second use of the at least one inference generated by the second AI model by the second inference consumer.

18. The method of claim 17, wherein the first action is performed by the first inference consumer while the first inference consumer is unaware that the first inference consumer is using the poisoned inference, and the second action is performed by the second inference consumer while the second inference consumer is unaware of whether the at least one inference generated by the second AI model is poisoned or not.

19. The method of claim 1, wherein the AI model snapshot of the last good instance is an incremental snapshot comprising only a subset of information that is contained in a last full snapshot of the non-poisoned instance of the poisoned AI model, the subset of information comprising neuron weights that have changed since the last full snapshot, and the incremental snapshot being smaller in size than the last full snapshot.

20. The method of claim 1, wherein obtaining the quantification of the impact of the poisoned inference on the first inference consumer comprises:

obtaining, based on the first use of the poisoned inference, a first sub-quantification indicating a first percentage of first recommendations followed by the first inference consumer resulting from the first use of the poisoned inference, and the first recommendations are based on the poisoned inference and provided to the first inference consumer with the poisoned inference;

obtaining, based on the second use of the at least one inference generated by the second AI model, a second sub-quantification indicating a second percentage of second recommendations followed by the second inference consumer resulting from the second use of the at least one inference generated by the second AI model, and the second recommendations are based on the at least one inference generated by the second AI model and provided to the second inference consumer with the at least one inference generated by the second AI model; and obtaining a difference between the first sub-quantification and the second sub-quantification, the difference being used as the quantification of the impact of the poisoned inference on the first inference consumer.

* * * * *